United States Patent
Zhang et al.

(10) Patent No.: US 7,436,988 B2
(45) Date of Patent: Oct. 14, 2008

(54) 3D FACE AUTHENTICATION AND RECOGNITION BASED ON BILATERAL SYMMETRY ANALYSIS

(75) Inventors: Liyan Zhang, Jiangsu (CN); Anshuman Razdan, Phoenix, AZ (US); Gerald Farin, Paradise Valley, AZ (US)

(73) Assignee: Arizona Board of Regents, Tempe, AZ (US)

( * ) Notice: Subject to any disclaimer, the term of this patent is extended or adjusted under 35 U.S.C. 154(b) by 289 days.

(21) Appl. No.: 11/145,033

(22) Filed: Jun. 3, 2005

(65) Prior Publication Data

US 2006/0078172 A1  Apr. 13, 2006

Related U.S. Application Data

(60) Provisional application No. 60/577,367, filed on Jun. 3, 2004.

(51) Int. Cl.
*G06K 9/00* (2006.01)
(52) U.S. Cl. ........................................ 382/118; 382/154
(58) Field of Classification Search ................. 382/118, 382/154
See application file for complete search history.

(56) References Cited

U.S. PATENT DOCUMENTS

| | | | | |
|---|---|---|---|---|
| 5,680,481 A | * | 10/1997 | Prasad et al. | 382/190 |
| 5,867,588 A | * | 2/1999 | Marquardt | 382/118 |
| 6,002,782 A | * | 12/1999 | Dionysian | 382/118 |
| 6,381,346 B1 | * | 4/2002 | Eraslan | 382/118 |
| 2002/0106114 A1 | * | 8/2002 | Yan et al. | 382/118 |
| 2005/0044056 A1 | * | 2/2005 | Ray et al. | 706/52 |

OTHER PUBLICATIONS

Wu, Y.; Pan, G.; Wu, Z., Face Authentication Based on Multiple Profiles Extracted from Range Data, Jun. 9-11, 2003, Springer Berlin/ Heidelberg, vol. 2688/2003, pp. 515-522.*

Chen, W.; Okamoto, N.; Minami, T., Automatic Personal Identification based on Human Face Profiles, Electrical and Computer Engineering, 1998, IEEE Candadian Conference on, May 24-28, 1998, vol. 1, pp. 53-56.*

(Continued)

*Primary Examiner*—Matthew C. Bella
*Assistant Examiner*—Anthony Mackowey
(74) *Attorney, Agent, or Firm*—Scully, Scott, Murphy & Presser, P.C.

(57) ABSTRACT

There is provided a novel approach for automatic human face authentication. Taking a 3D triangular facial mesh as input, the approach first automatically extracts the bilateral symmetry plane of the face surface. The intersection between the symmetry plane and the facial surface, namely the Symmetry Profile, is then computed. By using both the mean curvature plot of the facial surface and the curvature plot of the symmetry profile curve, three essential points of the nose on the symmetry profile are automatically extracted. The three essential points uniquely determine a Face Intrinsic Coordinate System (FICS). Different faces are aligned based on the FICS. The Symmetry Profile, together with two transversal profiles, namely the Forehead Profile and the Cheek Profile compose a compact representation, called the SFC representation, of a 3D face surface. The face authentication and recognition steps are finally performed by comparing the SFC representation of the faces.

1 Claim, 11 Drawing Sheets
(7 of 11 Drawing Sheet(s) Filed in Color)

OTHER PUBLICATIONS

Yu, K.; Jiang, X.Y.; Bunke, H., Robust Facial Profile Recognition, Image Processing, 1996, Proceedings., International Conference on, Sep. 16-19, 1996, vol. 3, pp. 491-494.*

Beumier, C. and Acheroy, M., Automatic face authentication from 3D surface. British Machine Vision Conference, Sep. 14-17, 1998, pp. 449-458, University of Southampton, UK. (beumier98automatic. pdf).

Blanz, V. and Vetter, T., A Morphable Model for the Synthesis of 3D Faces. Computer Graphics Proc., 1999, pp. 187-194, Siggraph '99, Los Angeles, CA, USA. (Blanz_morphable_model_99).

Bronstein, A., Bronstein, M., and Kimmel, R., Expression-invariant 3D face recognition, Proc. Audio & Video-based Biometric Person Authentication (AVBPA), 2003, pp. 62-69, Lecture Notes in Comp. Science 2688, Springer-Verlag Berlin Heidelberg. (Bronstein_expressInvariance_faces2003.pdf).

Chang, K., Bowyer, K. and Flynn, P., Multi-Modal 2D and 3D Biometrics for Face Recognition. The proceedings of the IEEE international Workshop on Analysis and Modeling of Faces and Gestures (AMFG), Oct. 2003, Nice, France, IEEE. (KChang_amfg03.pdf).

Chua, C., Han, F. and Ho, Y., 3D human face recognition using point signature. 4th ICAFGR, Mar. 26-30, 2000, Gernoble, France (point_signature_chua_00.pdf).

Duc, B. Fischer, S. and Bigun, J., Face Authentication with Gabor Information on Deformable Graphs, IEEE Transactions on Image Processing, Apr. 1999. pp. 504-516, vol. 8, No. 4, IEEE. (face-authentication-with-gabor_99.pdf).

Gordon, G., Face recognition based on depth and curvature feature, Proceeding of the IEEE Computer Society Conference on Computer Vision and Pattern Recognition, 1992, pp. 808-810, IEEE. (gordon_cvpr92.pdf).

Lao, S., Sumi, Y., Kawade, M. and Tomita, F., 3D template matching for pose invariant face recognition using 3D facial model built with isoluminance line based stereo vision, International Conference on Pattern Recognition (ICPR), 2000, pp. II:911-916., IEEE. (Lao_3D_poseInvariance_faceRecog_2000.pdf).

Lee, Y., Park, K., Shim, J. and Yi, T., 3D Face Recognition Using Statistical Multiple Features for the Local Depth Information, 16th International Conference on Vision Interface, Jun. 2003: (slat_multi_feature_3dFaceRecog_2003.pdf).

Lu, X., Colbry, D. and Jain, A., Matching 2.5D scans for face recognition, International Conference on Pattern Recognition (ICPR), 2004, pp. 362-366. (2_5_face.pdf).

Medioni, G. and Waupotitsch, R., Face recognition and modeling in 3-D, Proceedings of the IEEE International Workshop on Analysis and Modeling of Faces and Gestures (AMFG), Oct. 2003, pp. 232-233, IEEE. (Face Modeling and Recognition in 3-D_2003.pdf).

Chen, X., Flynn, P. and Bowyer, K., Visable-light and Infrared Face Recognition, The proceedings of Workshop on Multimodal User Authentication, Dec. 2003, pp. 48-55, Santa Barbara, CA, USA (ChenMMUA_2003.pdf).

Pan, G., Wu, Y., Wu, Z. and Liu, W., 3D Face Recognition by Profile and Surface Matching, Proceedings of the International Joint Conference on Neural Networks, 2003, IEEE. (face_profile_surface. pdf).

Tanaka, H. and Ikeda, M. and Chiaki, H., Curvature-based surface recognition using spherical correlation principal directions for curved object recognition, Third IEEE International Conference on Automatic Face and Gesture Recognition, 1998, pp. 372-377, IEEE. (curvatureBased_face_recognition_98_Tanaka.pdf).

Wang, Y., Chua, C. and Ho, Y., Facial feature detection and face recognition from 2D and 3D images. Pattern Recognition Letters, 2002, pp. 1191-1202, vol. 23, Elsevier Science B.V. (Chua_facialFeatureDetection_faceRecog_2D3D_02_wang. pdf).

Xu, C., Wang, Y., Tan, T. and Quan, L., Automatic 3D Face Recognition Combining Global Geometric Features with Local Shape Variation Information, Proceedings of the Sixth IEEE International Conference on Automated Face and Gesture Recognition, May 2004, pp. 308-313, IEEE. (wang_2_3dFace_featureDetection_2004. pdf).

* cited by examiner

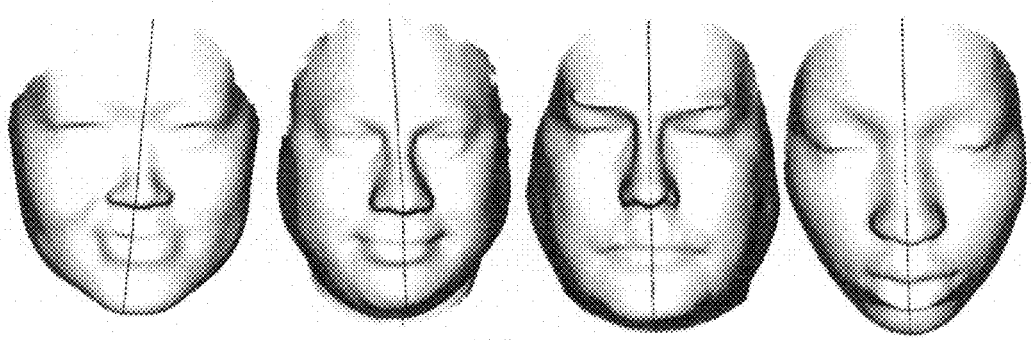
FIG. 7A
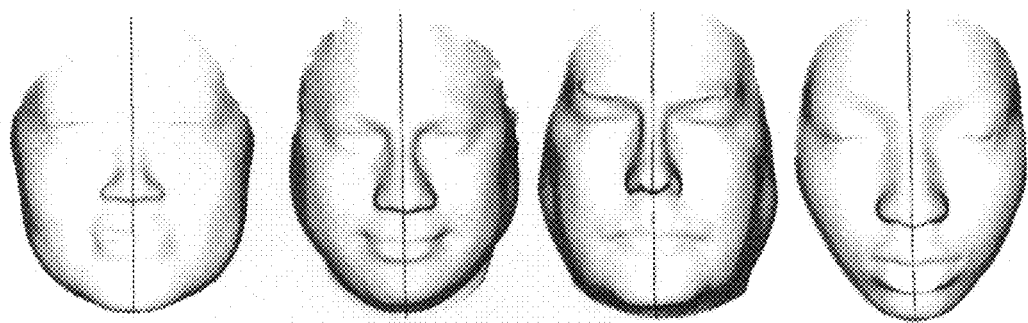
FIG. 7B
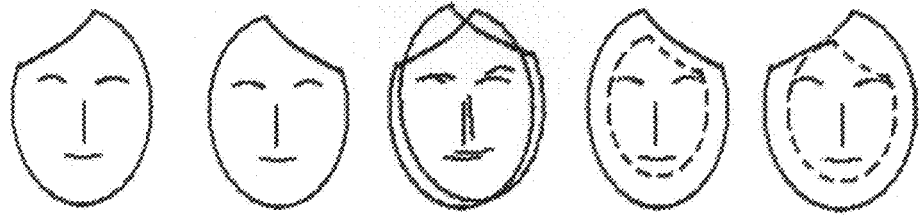
FIG. 8A    FIG. 8B    FIG. 8C    FIG. 8D    FIG. 8E
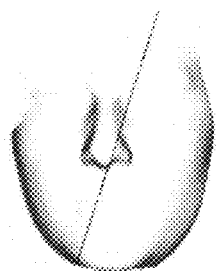
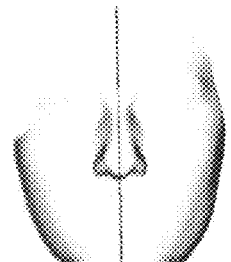
FIG. 8F    FIG. 8G    FIG. 8H

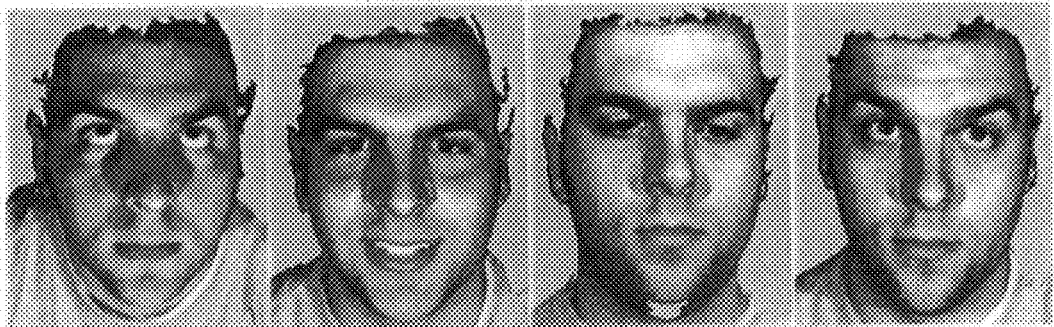
FIG. 15A (part 1)
FIG. 15B (part 1)
FIG. 15A (part 2)
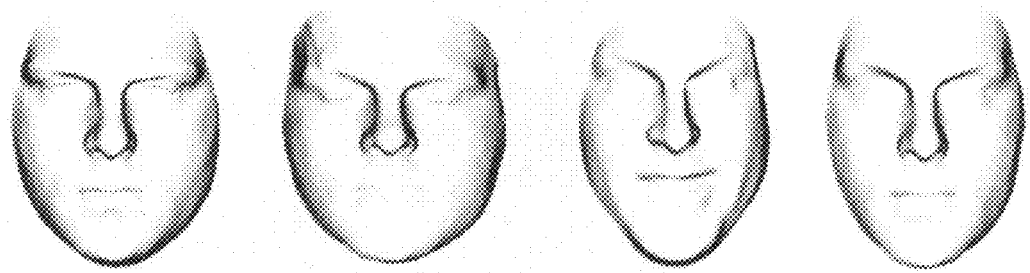
FIG. 15B (part 2)

3D FACE AUTHENTICATION AND RECOGNITION BASED ON BILATERAL SYMMETRY ANALYSIS

RELATED APPLICATION DATA

This application is based on and claims the benefit of U.S. Provisional Patent Application No. 60/577,367 filed on Jun. 3, 2004, the disclosure of which is incorporated herein by this reference.

U.S. GOVERNMENT FINANCIAL ASSISTANCE

Financial assistance for this project was provided by the United States Government, National Science Foundation Grant No. 0312849. The United States Government may own certain rights to this invention.

BACKGROUND

This invention relates to automatic face authentication and recognition. More particularly, it relates to a method and system for authentication and recognition of faces using a three-dimensional facial surface representation and facial bilateral symmetry plane extraction to derive a profile curve and a coordinate system for aligning facial representations for comparison.

Automatic face authentication refers to using facial images or scans to verify an identity claim of a known individual. Automatic face authentication has long been an active research area for its wide potential applications, such as law enforcement, security access, and man-machine interaction. Authentication involves performing verification based on a one-to-one search to validate the identity claim of an individual (i.e., access control for a building, room, or for making a transaction at an ATM terminal). Automatic face recognition refers to using facial images or scans to identify an unknown individual within a database of known individuals. Recognition in one-to-many searches is based on comparison to a database of known individuals (e.g., law enforcement, surveillance, and recently driver licenses). Face authentication is in one sense a simpler process than face recognition: comparisons are made only to the claimed identity, and a threshold of similarity is used to accept or reject the claim. In another sense, authentication is more difficult, because of the need to determine this threshold rather than using a "best match" criterion as in many face recognition applications. With face authentication, the group of invalid IDs (imposters) is, by definition, not in the reference database. Therefore, face authentication methods must successfully operate in 1-to-1 comparisons, without knowledge of possible errors in claims (i.e., who else might the individual be).

Several approaches have been promoted to recognize and authenticate an individual or a group of people. Access control applications authenticate by physical appearance (by guard personnel, receptionist); by something the individual knows (pins, passwords); by something the individual has (lock/key, card, badge, token); by biometric evidence (a unique physiological or behavioral characteristic of the individual); or by a combination of both "what one has" (i.e., a card) and "what one knows" (i.e., their passcode). Most workplace entry points are typically controlled by a badge/card or by physical appearance. All of these methods, except biometrics, are fallible and can be circumvented, lost, or stolen. Interest in authentication using biometrics is therefore growing dramatically.

Biometric access control uses measurable physiological or behavioral traits to automatically authenticate a person's identity. Biometric characteristics must be distinctive of an individual, easily acquired and measured, and comparable for purposes of security validation. The characteristic should change little over time (i.e., with age or voluntary change in appearance) and be difficult to change, circumvent, manipulate, or reproduce by other means. Typically, high-level computer based algorithms and database systems analyze the acquired biometric features and compare them to features known or enrolled in the database. The mainstream biometric technologies use morphological feature recognition such as fingerprints, hand geometry, iris and retina scanning, and two dimensional (2D) face authentication. Each of these except face authentication is either intrusive or fails in some cases (e.g., about 10% of population do not have good enough fingerprints).

There has been a large body of literature on 2D face recognition and authentication. For an overview, see R. Chellappa, C. Wilson, and S. Sirohey. Human and machine recognition of faces: A survey, Proceedings of the IEEE, 83(5): 705-740 (1995). Among various approaches, Principal Components Analysis (PCA) to face imaging, popularly called eigenfaces, is now a cornerstone in face recognition. For a more detailed explanation of PCA, see Turk, M., Pentland, A, Face recognition using eigenfaces, Proc. CVPR, 1991, pp 586-591. 2D face authentication, though less intrusive than other biometric technologies, has simply not attained the degree of accuracy necessary in a security setting. 2D face recognition methods are in general unable to overcome the problems resulting from illumination, expression or pose variations, facial hair and orientation.

The emerging trend noted by many researchers in the field of face recognition is the 3D technology, which offers several additional advantages to 2D face recognition. 3D technology is expected to be more accurate and able to overcome the problems of 2D methods, because 3D information is viewpoint and lighting condition independent. There are several strategies in 3D face recognition. Some researchers try to segment the 3D face surface into meaningful physiological points, lines and regions based on curvature analysis at each point. For example, Hallinan et al. utilized curvature properties to segment a face surface into regions, and a set of twelve features were extracted for face recognition. P. Hallinan, G. G. Gorden, A. L. Yuille, et al., Two and three-dimensional patterns of the face, A. K. Peters (ed), A K Peters Ltd (1999). Moreno et al., used a HK segmentation (based on the analysis of signs of mean and Gaussian curvatures at each point) to isolate regions of pronounced curvature, and up to eighty-six descriptors were obtained from the segmented regions. A. B. Moreno, Á. Sánchez, J. F. Vélez, et al., Face recognition using 3D surface-extracted descriptors, Proceedings of the $7^{th}$ Irish Machine Vision & Image Processing Conference, Antrim, N. Ireland, 2003. For the presence of noise, expression variance and incomplete scanning, however, curvature based feature extraction is not robust enough for face recognition. For example, Moreno et al. reported only a 78% correct recognition rate.

In some methods, 3D face modeling has been used as an enhancement of 2D analysis methods. For example, Blanz et al used a 3D morphable face model, which is learned from a set of textured 3D scans of heads, to encode images. V. Blanz, T. Vetter. Face Recognition Based on Fitting a 3D Morphable Model, IEEE Transactions on Pattern Analysis and Machine Intelligence, 25(9) (2003). Recognition is performed based on the model coefficients created in the process of fitting the morphable model to images. Lee et al. also presented a model-base face recognition approach under a similar framework. M. W. Lee, S. Ranganath, Pose-invariant face recognition using a 3D deformable model, Pattern Recognition, 36:1835-1846 (2003). In their method, the deformable 3D face model is a composite of an edge model, a color region model and a wireframe model. This strategy is a 2D solution in nature, for the media to be compared in these studies is still 2D intensity images. A problem with this strategy is that fitting the morphable model to images is a computational expensive process. As reported by Lee et al., 4.5 minutes are needed for fitting the model to an image on a workstation with a 2 GHz Pentium4 processor.

Chang et al. used both 2D and 3D face information for the recognition task. K. I. Chang, K. W. Bowyer, P. J. Flynn, Face Recognition Using 2D and 3D Facial Data, The Proceedings of Workshop in Multimodal User Authentication, pp. 25-32, Santa Barbara, Calif., USA (2003). In their experiments, a PCA-based approach was tuned for face recognition from 2D intensity images and 3D range images, respectively. Their comparison result is that 3D outperforms 2D. By combining the 2D distance metric and the 3D distance metric, a 2D-plus-3D criterion is used during the decision process of face recognition. In their experiments, pose variations that occur during the acquisition process are manually normalized. The recognition rate of the combination scheme was reported to be higher than 98% under the condition that the 2D and 3D images are taken in a front view and the subjects are imaged in a normal facial expression. The scheme of Chang et al., however, requires manual normalization and has to use normal facial expressions.

The work of Bronstein et al, focused on developing a representation of the facial surface, invariant to different expressions and postures of the face. A. Bronstein, M. Bronstein, and R. Kimmel, Expression invariant 3D face recognition, Audio and Video Based Biometric Person Authetication, pp. 62-69 (2003). Before using the basic idea of PCA, they calculate the geometric invariants of a face surface by using multidimensional scaling (MDS). For a discussion of MDS, see Schwartz, E. L., Shaw, A., Wolfson, E., A numerical solution to the generalized mapmaker's problem: flattening nonconvex polyhedral surfaces, IEEE Trans. PAMI, 11: 1005-1008 (1989). Bronstein et al. did not report the recognition rate, though they claimed that their algorithm can recognize the difference of twins. Although they did not discuss in detail the computation cost of their method, it appears to be high because MDS needs to calculate the geodesic distances between each pair of points on the surface, as well as the eigen decomposition of a large matrix.

Chua et al. analyzed over four expressions of each person to determine the rigid parts of the face. C., F. Han, Y. Ho, 3D Human Face Recognition Using Point Signature, $4^{th}$ IEEE International Conference on Automatic Face and Gesture Recognition, Grenoble, France, (2000). These rigid parts are modeled by point signatures for face indexing. Their method, however, was tested on only six individuals.

Taking a different approach, Beumier et al. developed an integrated 3D face acquisition and comparison system. C. Beumier, M. Acheroy, Automatic 3D face authentication. Image and Vision Computing, 18:315-321 (2000). The structured light was used to capture the facial surface. For facial surface comparison, they abandoned feature extraction but calculated the global matching error of the facial surfaces. An Iterative Condition Mode (ICM) optimization was performed to determine the rotation and translation transform that minimizes the global matching error sampled at fifteen profiles. In order to speed up the global matching process, they further extracted the central profile with maximal protrusion (due to the nose). The central profile and a mean lateral profile were used to compare two faces in the curvature space. The main advantages of this method are its high speed and low storage needs. But as the authors pointed out, the optimization procedure used for the 3D face comparison can fail due to noise, local minima or bad initial parameters. The reported Equal Error Rate, i.e, the rate at which false acceptances (i.e., incorrectly accepting an imposter claim) and false rejects (i.e., incorrectly rejecting a valid claim) are equal (the two rates tend to be inversely rated), is 9%. So they resorted to manual refinement for surface matching. Cartoux et al. presented a similar approach to extract the symmetry profile by looking for the bilateral symmetry axis of Gaussian curvature values of the facial surface. J. Y. Cartoux, J. T. Lapreste, M. Richetin, Face authentification or recognition by profile extraction from range images, IEEE Computer Society Workshop on Interpretation of 3D Scenes, pp 194-199 (1989).

There is a need, therefore, for an improved method and system for authentication and recognition using 3D facial data that is computationally faster and more accurate in matching facial features.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a novel system and method for automatic face authentication. The system and method utilize a 3D triangular facial mesh surface as an input, and automatically extract a bilateral symmetry plane of the face surface. The intersection between the symmetry plane and the facial surface, namely the Symmetry Profile, is then computed. By using both the mean curvature plot of the facial surface and the curvature plot of the symmetry profile curve, three essential points of the nose on the symmetry profile are automatically extracted. The three essential points uniquely determine a Face Intrinsic Coordinate System (FICS). Different faces are aligned based on the FICS. The Symmetry Profile, together with two transversal profiles, namely the Forehead Profile and the Cheek Profile, comprise a compact representation, called the SFC representation, of a 3D face surface. The face authentication and recognition steps are performed by comparing the SFC representation of the faces. The system and method of our invention provide greatly enhances accuracy in comparison to 2D methods and overcomes the barrier of computational complexity in comparing 3D facial data.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

FIG. 7 shows results of the estimated mirror plane (FIG. 7A) and the extracted symmetry plane (FIG. 7B) for four facial meshes.

FIG. 8A-8H illustrate the MarkSkirt process used for correct for errors in calculation of the symmetry plan than can be caused by irregular boundaries of a facial mesh. FIG. 8A shows a 3D facial mesh with an incomplete boundary. FIG. 8B shows the mirrored mesh corresponding to the mesh of FIG. 8A. FIG. 8C shows the alignment of the meshes of FIGS. 8A and 8B by using the ICP algorithm directly, which is not expected. FIG. 8D shows the region between the boundary and the dashed curve on the mirrored mesh, which region is called the "skirt." FIG. 8E illustrates the alignment of the non-skirt region on $S_m$ and the original mesh S, which represents the expected correct alignment. FIGS. 8F-8H illustrate an example where part of the forehead is missing due to the occlusion of hair. The vertices colored red in FIG. 8F are the SkirtVertices skirt($s_m$). FIG. 8G demonstrates the computed symmetry plane without the MarkSkirt process, and FIG. 8H shows the result with the MarkSkirt process.

FIG. 13 shows the SFC representation of an example facial surface, wherein

FIG. 15 shows scans of multiple expressions for an individual. FIG. 15A shows the textured 3D meshes directly output by the scanner.

FIG. 18 shows two scans of part of the tested individuals used in face recognition experiment according to our invention.

DESCRIPTION

Figure 1:
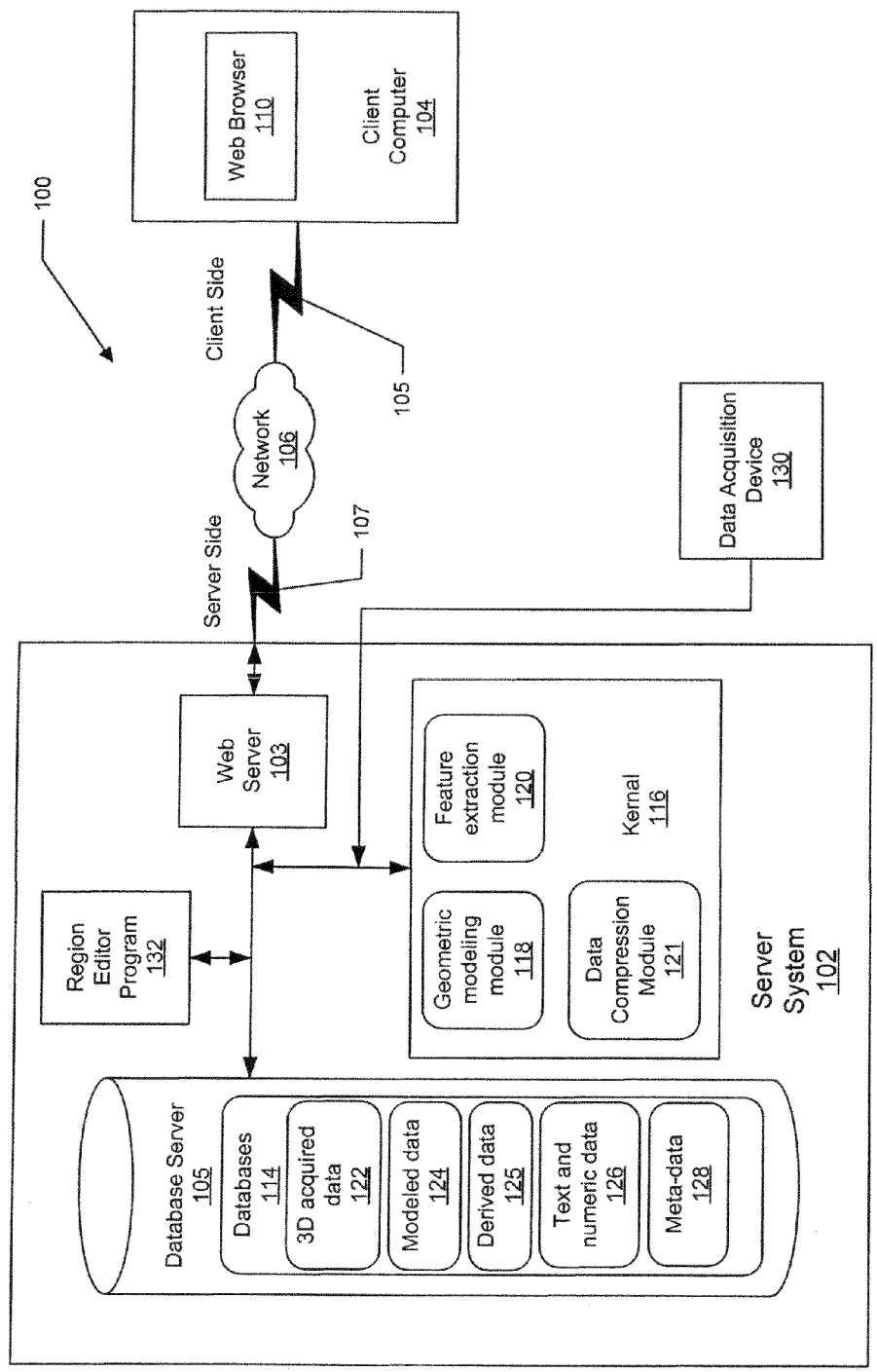
FIG. 1 is a functional block diagram of an exemplary computer system for archiving, cataloging, query, comparison and retrieval of information relating to 3D facial features in accordance with the present invention.

FIG. 1 illustrates in schematic block diagram form an exemplary computer network system 100 for storing, archiving, query and retrieval of information relating to 3D facial features according to the present invention. The computer network system 100 includes a server computer system 102 and a client computer system 104, which are connected by data connections 105, 107 to a computer network 106, e.g., an intranet, the Internet and/or the World Wide Web, so that the client computer system 104 and the server computer system 102 can communicate. As will be readily apparent to persons skilled in the art, the client computer system 104 is intended to be representative of a plurality of client computer systems 104, each of which may communicate with the server computer system 102 via the network 106, whether sequentially or simultaneously. The computer network system 100 advantageously makes use of standard Internet protocols including TCP/IP and HTTP. TCP/IP is a common transport layer protocol used by a worldwide network of computers. Although the client 104 and the server computer 102 are coupled together via the Internet, the invention may also be implemented over other public or private networks or may be employed through a direct connection and any such communication implementation is contemplated as falling within the scope of the present invention.

The server computer system 102, which has a conventional architecture, includes: a central processing unit (CPU), which may be implemented with a conventional microprocessor; means for temporary storage of information, which may be implemented with random access memory (RAM); and means for permanent storage of information, which may be implemented with read only memory (ROM); and means for mass storage of information, which may be implemented by hard drive or any other suitable means of mass storage known in the art.

It will be obvious to someone of ordinary skill in the art that the invention can be used in a variety of other system architectures. As described herein, the exemplary system architecture is for descriptive purposes only. Although the description may refer to terms commonly used in describing particular computer system architectures the description and concepts equally apply to other computer network systems, including systems having architectures dissimilar to that shown in FIG. 1.

Still referring to FIG. 1, the server computer system 102 includes a Web server 103, and a database server 105. The Web server 103 manages network resources and handles all application operations between the browser-based clients 104 and the server side applications. The database server 105 includes a database management system (DBMS), a collection of programs that enables the storing, modification and extraction of information from databases 114. The Web server 103 facilitates communication and data exchange between the client 104 and database 114.

One or more data acquisition devices 130 can be used to generate raw 3D data from a face and to input the raw 3D data to the server 102. Some examples of suitable data acquisition devices 130 include laser scanners for acquiring 3D surface data. It will be understood by those of skill in the art, however, that the data acquisition devices 130 can include any device that generates digitized 3D data from a face. For example, the data acquisition device is not limited the facial surface obtained by a specific type of scanner.

A program kernal 116 executes on the server computer system 102 and implements the logical operations of the system, as described below. The kernal 116 includes a geometric modeling module 118, which can derive 3D and 2D modeled data from the raw 3D data. A feature extraction, analysis and indexing module 120 can operate to provide cataloging, description and interactive access to the modeled data, as well as to stored textual and descriptive data about the object. A data compression module 121 can compress certain data for enhanced storage and transmission. A region editor program 132 also executes on the server computer system 102. The region editor program 132 functions to break the mesh down into "meaningful" connected subsets of vertices called "regions."

The database 114 can comprise a number of different databases for storing various data element. These data elements include: 3D acquired data 122, such as that generated by the data acquisition device 130; modeled data 124, which the geometric modeling module 118 generates from the 3D acquired data; derived data 125, which the extraction, analysis and indexing module derives from the modeled data 124, and textual and numeric data 126. The database 114 also stores metadata 128 for describing the data and how the data is formatted. The schema discussed herein further describes the metadata 128.

The 3D acquired data 122 can be 3D surface data, such as that generated by optically scanning the surface of a face. The modeled data 124 is data that has been structured or modeled from the acquired data 122 using suitable models, such as triangular meshes or surface representation models. The derived data 125 includes data derived from the modeled data, such as object features or mathematical descriptive date extracted from the modeled data. The text and numeric data 126 can include, for example, area curvature distribution and the like.

Figure 2:
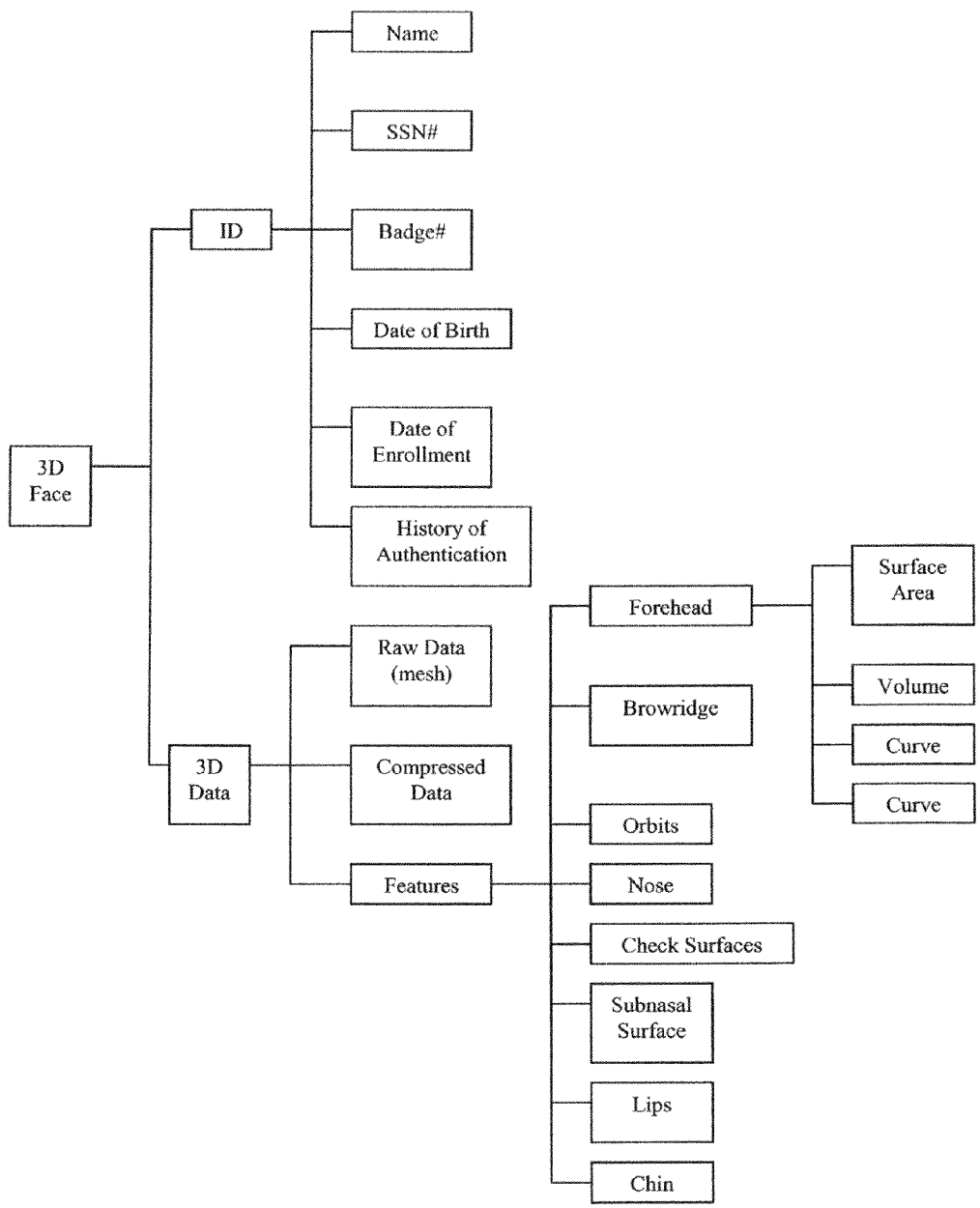
FIG. 2 shows an exemplary XML schema according to the present invention to support the archiving, cataloging, query, comparison and retrieval of 3D facial features according to the present invention.

The data elements are organized, cataloged and described according to a schema to facilitate efficient archiving, query of and interaction with the data. In one preferred embodiment, the schema is written in XML (eXtensible Markup Language). FIG. 2 depicts an example of an XML schema for 3D facial features. The 3D information data structures at the top-level house original binary data files, modeled files, and derived features.

Still referring to FIG. 1, the client 104, which also has a conventional architecture, includes: a CPU, which may be implemented with a conventional microprocessor; means for temporary storage of information, which may be implemented with RAM; and means for permanent storage of information, which may be implemented with ROM; and means for mass storage of information, which may be implemented by hard drive or any other suitable means of mass storage known in the art; one or more input devices for inputting information into the computer, which may be implemented using a conventional keyboard and mouse, and an output device for display graphical output to the user, such as a conventional monitor. The client 104 includes conventional hardware and software for communicating over the network 106. In a preferred embodiment, this includes a Web browser software application 110, which executes on the client 104 to access information available on the Internet. The system and method of the present disclosure advantageously utilizes the full functionality of such browser programs, as are known to persons skilled in the operation and use thereof.

Figure 3A:
FIG. 3 shows an example of a 3D camera scan (FIG. 3A) and its corresponding triangle mesh geometry (FIG. 3B).
FIG. 3B shows the corresponding clean faces without texture.
Figure 3B:
Figure 4:
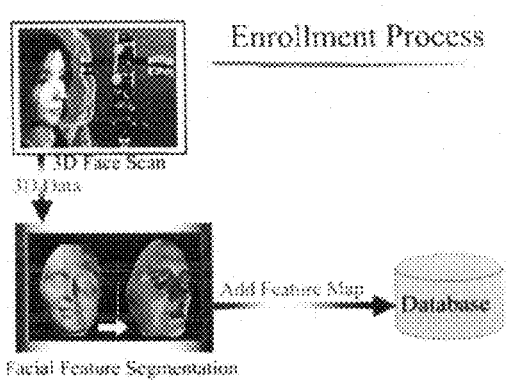
FIG. 4 illustrates the enrollment process for archiving 3D facial data in the database of the system of FIG. 1.
Figure 5:
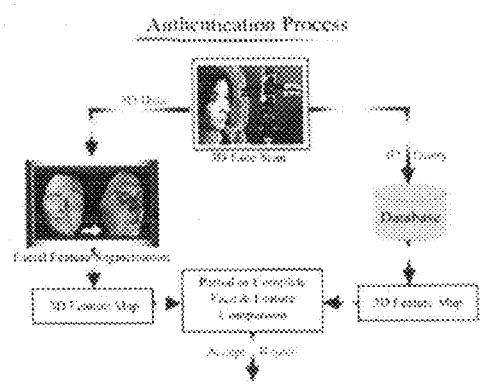
FIG. 5 illustrates the general operation of the system of FIG. 1 to authenticate a facial image or scan of an individual by comparing it with archived 3D data to verify the identity claim of the individual.

3D Face Data Acquisition. According to one preferred method of the invention, the 3D facial surface we are dealing with is a triangular mesh, which is the most popular representation of 3D geometry. Quite a few types of 3D scanners can output triangular face meshes directly or by means of some surface reconstruction software. 3D scanners operate much like 2D cameras, except that the image results in a 3-dimensional point cloud that models the face. The scanning process is similar to a snapshot portrait: the 3D image is acquired instantly and is extremely unobtrusive. According to one preferred method of the present invention, a point cloud is captured using a commercially available camera, then software produces a meshed surface that accurately models the face as 3-D triangle mesh geometry. FIG. 3 shows an example of a 3D camera scan of a face (FIG. 3A) and its corresponding triangle mesh geometry (FIG. 3B). The conversion of point clouds into triangle meshes is well known. This process is described in more detail in H. Hoppe, T. DeRose, T. Duchamp, M. Halstead, H Jin, J. McDonald, J. Schweitzer, and Stuetzle, W., Piecewise Smooth Surface Reconstruction, SIGGRAPH 94, ACM Press, pp. 295-302 (1994) and A. Razdan, B. Steinberg, G. Farin, From Digitized Data to NURB Surface Meshes, Proceedings of the International Conference of Rapid Prototyping and Manufacturing, pp 749-754, Beijing, China (1998), which are incorporated herein in their entirety by this reference. Preferably, the 3D surface data points are less than 300 microns (0.3 mm) apart, providing the capability of distinguishing between small, subtle differences regardless of lighting or orientation during the original scan. The resulting data is representative of the surface being scanned (a face in this case).

Intelligent Archiving and Data Management. According to a preferred method of the invention, the raw 3D face data is archived with additional semantic information. As previously described, segmentation of 3D features provides the basis for creating feature based indices for archival and query. For example, the nose serves as a facial feature, and its surface area and curvature distribution make up some of the metadata information.

The database structures preferably take advantage of the latest object-oriented advances and the established relational technology. Databases such as Oracle provide the well-known advantages of relational databases with extended support for objects, such as storing the behavior of the object as methods. Since the 3D facial data are inherently objects, the database design can take advantage of the structure of the data itself.

The flexible, scalable model for complex 3D facial data preferably provides: a hierarchy of categories, metadata and shared descriptive vocabulary to provide authority control over data entry, retrieval and display; support for supplementary information associated with the 3D facial data, e.g., reference to identification information such as name, social security/id etc. that are generally present in databases; support for reference descriptive geometric measurements and metrics such as curvature, volume, scale, linear dimensions; a model for archiving and storing of 3D facial data, addressing issues such as file formats, compression, media, disaster recovery, and migration to alternate formats. Once the 3D facial data has been modeled and features have been extracted, these elements can be automatically catalogued and described using the schema developed for facial data.

According to a preferred embodiment, class models for face data type are implemented as XML document type declarations (DTDs) that define the schema for a particular XML file type. The DTDs are designed to be consistent with emerging standards (including Dublin Core, W3C), and facial data standards. FIG. 2 shows a sample XML schema that can be used in connection with the invention.

Figure 6:
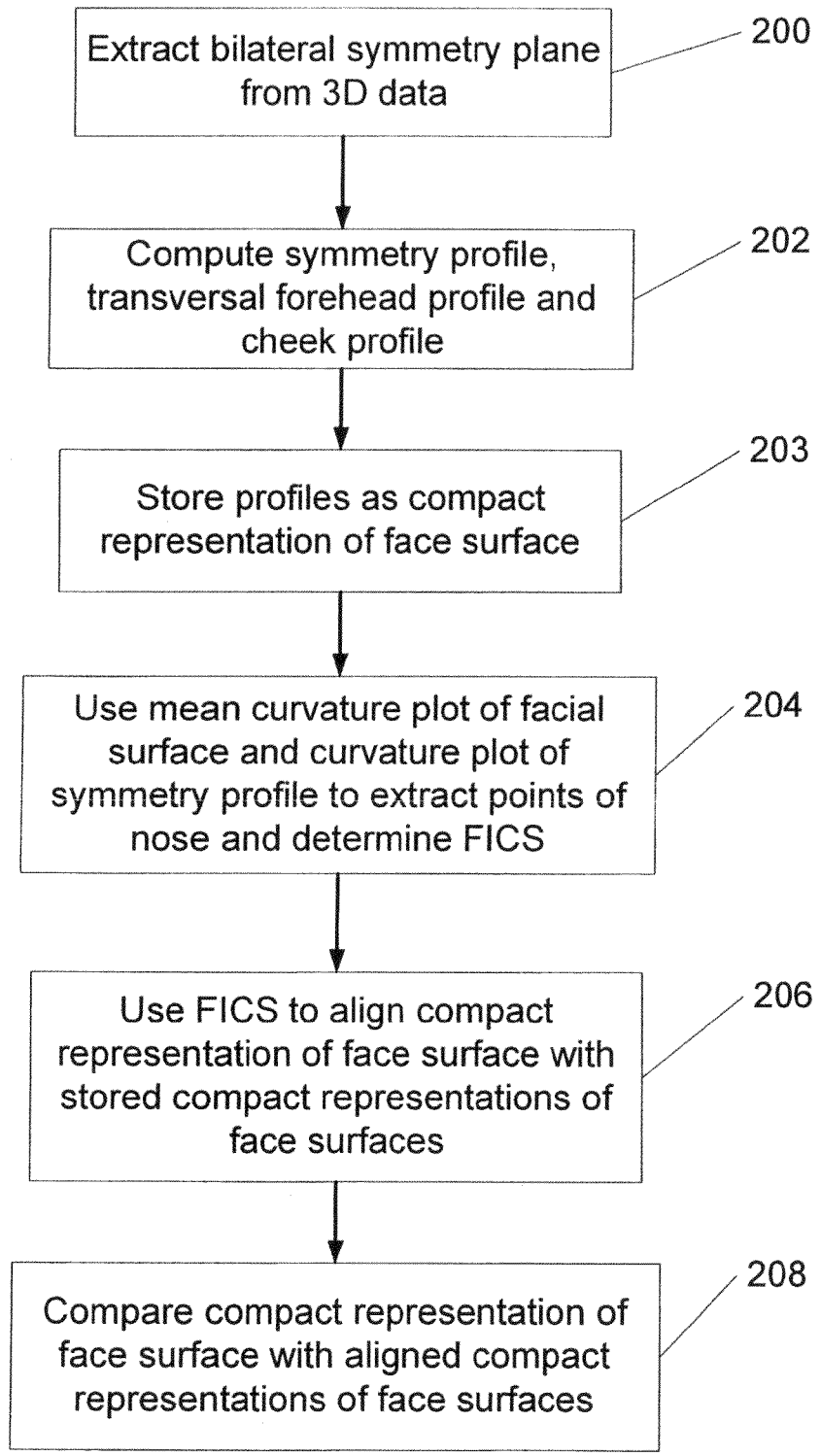
FIG. 6 is a diagram of the steps of a preferred method for authenticating a face according to the present invention using a three-dimensional facial surface representation and facial bilateral symmetry plane extraction to derive a profile curve and a coordinate system for aligning facial representations for comparison.

According to the present invention, the bilateral symmetry of a human face is an important global feature for understanding the face. Similar to Beumier, et al., our approach is based on facial bilateral symmetry extraction and thereby the symmetry profile as well, but we use a different method based on mirror reflection and model registration. C. Beumier, M. Acheroy, Automatic 3D face authentication. Image and Vision Computing, 18:315-321 (2000). Referring to FIG. 6, a preferred method according to our invention by extracting the bilateral symmetry plane the facial mesh (step 200). A symmetry profile is computed (step 202). The symmetry profile represents the intersection between the symmetry plane and the facial mesh. In addition to the symmetry profile, a transversal forehead profile for the facial mesh is then computed (step 202) and a transversal cheek profile for the facial mesh is computed (step 202). The symmetry profile, the forehead profile and the cheek profile are stored as a compact representation of the surface of the face to be authenticated (step 203). We use a novel method based on both the mean curvature plot of the facial surface and the curvature plot of the symmetry profile curve to accurately extract three points of the nose on the symmetry profile (step 204). The three extracted points uniquely determine a Face Intrinsic Coordinate System (FICS). The face intrinsic coordinate system is used to align the compact representation of the surface of the face to be authenticated with one or more stored compact representations of faces (step 206). The compact representation of the surface of the face to be authenticated is then compared with the one or more stored compact representations of faces (step 208).

Symmetry Plane Extraction

A 3D object is bilaterally symmetric if there exists some plane, such that the object is invariant under reflection through that plane.

Bilateral symmetry computation of shapes and images is a basic problem in the field of mathematics, computer vision, image processing and the like. Most symmetry extraction algorithms are designed for 2D applications. Examples of such algorithms are described by D. Reisfeld, H. Wolfson, Y. Yeshurun, Detection of interest points using symmetry, Proc. of the ICCV'1990. pp. 62-65, and Y. Liu, K. L. Schmidt, J. F. Cohn, et al., Facial asymmetry quantification for expression invariant human identification, Computer Vision and Image Understanding. 91(1,2): 138-159 (2003). Only some of these algorithms, however, can be extended to 3D. H. Zabrodsky, S. Peleg, D. Avnir, Symmetry as a continuous feature, EEE transactions on Pattern Analysis and Machine Intelligence, 17:1154-1166 (1995). One category of methods computes the 3D bilateral symmetry plane by using the principal axes of inertia, i.e. the eigenvectors of the covariance matrix of the point distribution. For example, O'Mara et al used this idea to measure bilateral symmetry in three dimensional magnetic resonance images of human heads. D. O'Mara, R. Owens, Measuring bilateral symmetry in three dimensional magnetic resonance images, *TENCON Digital Signal Processing Applications*, Piscataway, U.S.A., pp 151-156 (1996). Tuzikov et al also used the principal axes of inertia to define the brain symmetry plane in MR images. A. V. Tuzikov, O. Colliot, I. Bloch, Brain symmetry plane computation in MR images using inertia axes and optimization, ICPR12002 Quebec, Canada. But in their approach, an optimization process (the downhill simplex method) was further used to find a more accurate symmetry plane.

Another category of methods treats the bilateral symmetry extraction as a registration problem between the original and the reflected images. Benz, et al used this method to compute the symmetry plane of a human face. M. Benz, X. Laboureux, T. Maier, et al., The Symmetry of Faces, Proceedings of VMV'2002, Erlangen, Germany. They first mirror the whole dataset of a face, which is represented in a 3D triangular mesh, at an arbitrary plane. Then the ICP (Iterative Closest Point) algorithm was used to align the original and the mirrored facial surfaces. For a more detailed discussion of this process, see P. J. Besl, N. D. McKay, A method for registration of 3-D shapes, IEEE Trans. on Pattern Analysis and Machine Intelligence, 14(2):239-256 (1992). Based on the registered two datasets, the symmetry plane of the face can be easily computed. Their study is also for a clinical application—to support the surgeon intraoperatively during the repair of a displacement of the eye globe of a patient. Because the ICP algorithm is sensitive to the initial relative position of the two shapes to be registered, however, they have to manually coarsely register the two data sets before running the ICP algorithm.

We use the basic idea of mirror transformation followed by a registration procedure to extract the symmetry plane of a human face. To make the entire process totally automatic and pose-invariant, we first determine the most appropriate position of the mirror plane by means of the principal component analysis (PCA), so that the original mesh and the mirrored mesh are approximately aligned. The ICP algorithm is then used to get a refined registration.

Mirror Plane Determination

Let S(P, K) denote the triangular facial mesh surface, where P is a set of N point positions $p^i$ (xi, yi, zi)∈$R^3$, $1 \leq i \leq N$, and K is an abstract simplicial complex which contains the adjacency information of vertices: v={i}∈K, edges: e={i j}∈K and triangular facets: f={i,j,k}∈K.

Suppose $O_s$ is the centroid of the facial mesh S(P, K). We first construct the covariance matrix of the vertex distribution as follows:

$$C = \sum_{i=0}^{N} (p^i - O_s)(p^i - O_s)^T \quad (1)$$

By means of principal component analysis, we can get three eigenvalues $\lambda_1 \geq \lambda_2 \geq \lambda_3$ and the three corresponding eigenvectors $v_1$, $v_2$ and $v_3$ of C. The facial surface we are dealing with is the frontal part of the head and the dimension in up/down direction is typically longer than that in left/right direction. Thus, the covariance matrix C is expected to have three different eigenvalues. The eigenvector $v_3$ represents the normal direction of the least square fitted plane of the facial surface. The eigenvector $v_1$ corresponds to the up/down direction of the facial surface. The complexity of the PCA algorithm is O(N).

Taking $O_s$ as the origin, $v_1$ as the y-axis, $v_3$ as the z-axis, we define a new right-hand coordinate system. This coordinate system is called the Pose Coordinate System (PCS), for it represents the head pose and depends only on the vertex distribution of the facial surface. The original facial surface S(P,K) is first transformed to the pose coordinate system. We then use the yz coordinate plane of the PCS as the mirror plane to get a mirrored facial surface $S_m$. This procedure can be described as $$p_m^i \leftarrow R \cdot A \cdot (p^i - O_s) \qquad (2)$$
$$p^i \leftarrow A \cdot (p^i - O_s)$$
$$R = \begin{bmatrix} -1 & 0 & 0 \\ 0 & 1 & 0 \\ 0 & 0 & 1 \end{bmatrix}, \quad A = \begin{bmatrix} v_2^x & v_1^x & v_3^x \\ v_2^y & v_1^y & v_3^y \\ v_2^z & v_1^z & v_3^z \end{bmatrix}$$

where $p_m^i$ is the mirrored point of $p^i$; A is the rotation matrix from the original coordinate system to the PCS; R is the reflection matrix with respect to the mirror plane; v in matrix A represents the components of the eigenvectors $v_1$, $v_2$ and $v_3$ of C.

In case the face dimension in the up/down direction is shorter than or approximately equal to that in the left/right direction (of all the 213 facial meshes we tested, no such case arose), the xz instead of yz coordinate plane of the pose coordinate system may be the best mirror plane. This can be solved by trying both xz and yz coordinate plane as the mirror plane, and selecting the one that leads to smaller residual mean distance in the model registration procedure described below.

FIG. 7 shows the results of the intersection between the estimated mirror plane and the facial mesh surface on four individuals. FIG. 7B illustrates the intersection between the mirror planes (by the PCA algorithm) and the facial meshes, and FIG. 7B illustrates the intersection between the automatically extracted symmetry planes and the facial meshes (by aligning the mirrored and the original facial meshes. It is known that if an object is bilaterally symmetric, then the symmetry plane passes through its centroid and is orthogonal to some principle axis. FIG. 7 demonstrates that the mirror plane computed by using PCA is close to the symmetry plane but not accurate in some cases. This can be explained by three reasons. First, the face itself is not perfectly symmetric. Second, the centroid $O_s$ is obtained by averaging all the vertices in the facial mesh S, but the distribution of the vertices of the meshes is not perfectly even. Third, and most important, the boundary of the facial mesh is irregular and might be quite asymmetric.

Model Registration

Since the mirror plane does not coincide with the real symmetry plane in most cases, there exists some misalignment between the mirrored mesh $S_m$ and the original mesh S. To get an optimized registration, we use the basic idea of the Iterative Closest Point (ICP) algorithm. The ICP algorithm is described in more detail by P. J. Besl, N. D. McKay, A method for registration of 3-D shapes, IEEE Transactions on Pattern Analysis and Machine Intelligence, 14(2):239-256 (1992), which is incorporated herein in its entirety by this reference.

Given two 3D point sets C, and $C_2$, the main steps of the ICP algorithm are:
(1) For every point in $C_2$, compute its closest point in $C_1$.
(2) The mean square distance metric of the pairs of closest points are minimized with respect to a rigid body transform.
(3) Apply the transform to $C_2$.
(4) Terminate the iteration if the change in mean square distance falls below a preset threshold, otherwise, return to Step (1).

In our case, the two data sets are vertices of the facial meshes S and $S_m$. Since the boundary of the facial mesh could be irregular (see, e.g. FIG. 8A), S and $S_m$ may be misaligned (see FIG. 8C), which leads to an incorrect symmetry plane. To solve this problem, we employ a procedure called MarkSkirt.

First, we introduce the neighborhood relation nbhd:

$$nbhd\{i\} := \{i\} \cup \{j | \exists \{i,j\} \in K\} \; nbhd\{i_1, i_2, \ldots, i_k\} := \bigcup_{\mu=1,\ldots,k} nbhd\{i_\mu\} \qquad (3)$$

We also use the following recursive definition:

$$nbhd^1\{i\} := nbhd\{i\} \; nbhd^n\{i\} := nbhd\{nbhd^{n-1}\{i\}\}, \; n \geq 2 \qquad (4)$$

$nbhd_n\{i\}$ is also called the n-ring neighbors of vertex $\{i\}$. The MarkSkirt procedure finds and marks the n-ring neighbors of all the vertices on the boundary of the mirrored mesh $S_m$ as Skirt. This is defined as $$\text{Skirt}(S_m) := \{j | j \in \bigcup_{\{i\} \in \partial S_m} nbhd^n\{i\}\} \qquad (5)$$

where $\partial S_m$ represents the boundary of $S_m$.

After the MarkSkirt procedure, we obtain:

$$P'_m = P_m \backslash \text{Skirt}(S_m) \qquad (6)$$

where $P_m$ denotes the vertex set of $S_m$. Only the vertices in $P'_m$ are sampled to match with the original mesh S. This is to make sure that the region to be matched with the original mesh S is the subset of S (see FIG. 2 E), for the ICP algorithm has good performance when the geometry of one data set is the subset of the geometry to be matched to. In our experiments, 10-ring neighbors of the boundary are marked as Skirt. This procedure is crucial to get a correct alignment. Our experiments show about 15 percent of unexpected alignment without the MarkSkirt process. With the MarkSkirt process, however, all the 213 face data sets get visually pleasing symmetry planes (some of the tested faces have very special and asymmetric expressions). The appearance itself of some individuals is slightly asymmetric, but the intrinsic asymmetry is reproductive in different scans, and hence will not affect the decision making in authentication and recognition tasks.

FIG. 8 illustrates the MarkSkirt procedure. FIG. 8A shows a 3D facial mesh with an incomplete boundary. FIG. 8B shows the mirrored mesh corresponding to the mesh of FIG. 8A. FIG. 8C shows the alignment of the meshes of FIGS. 8A and 8B by using the ICP algorithm directly, which is not expected. FIG. 8D shows the region between the boundary and the dashed curve on the mirrored mesh, which region is called the "skirt." FIG. 8E illustrates the alignment of the non-skirt region on $S_m$ and the original mesh S, which represents the expected correct alignment. FIGS. 8F-8H illustrate an example where part of the forehead is missing due to the occlusion of hair. The vertices colored red in FIG. 8F are the SkirtVertices skirt($s_m$). FIG. 8G demonstrates the computed symmetry plane without the MarkSkirt process; and FIG. 8H shows the result with the MarkSkirt process.

Referring again to the steps of the ICP algorithm, the complexity in Steps (2) and (3) are $O(N^2)$. But in Step (1), the complexity for computing the entire set of the closest points is $O(N^2)$, and the computation needs to be performed in every iteration. The ICP algorithm is normally time-consuming due to the cost of finding the closest points. According to a preferred method of our invention, two procedures are used to speed up the ICP algorithm. First, partial instead of entire vertices of $P'_m$ are randomly sampled to match with the original mesh S. In our experiments, only 5% of the vertices in $P'_m$ are used. This is reasonable also because of the fact that the ICP algorithm has good performance when one data set is the subset of the other one. We further speed up the closest points finding process by using a space partitioning scheme. In the mirror plane determination process described above, we transformed the facial mesh S to the Pose Coordinate System. Now, we construct in PCS an axis-aligned bounding box that encloses S and $S_m$. The bounding box is then partitioned into m×n×l cells. And the searching for the closest point of vertex $\{i\} \in S_m$ can be limited to the closest cells surrounding $\{i\}$. In our experiments, the number of cells m in the x-direction (corresponding to the approximate left/right direction) is set to 10. Suppose the edge lengths of the bounding box in x, y and z directions are $l_x, l_y, l_z$ respectively, then $n=10*l_y/l_x$, and $l=10*l_z/l_x$.

Our experiments show that the above mentioned schemes for accelerating the algorithm are effective. The average time spent on the process of ICP is 1.6 seconds (See Section 5.4 for more information on computation time). The good initial relative position of S and $S_m$, due to the adequate mirror plane computed by the PCA, not only gives more chances to achieve the global optimized registration, but also makes contribution to the rapid convergence of the ICP algorithm. Table 1 illustrates the mean distance between the pairs of closest points of the original mesh and the mirrored one for four persons in FIG. 1. From the values in the table we can see that the ICP procedure improves the alignment at various extents for different persons. We also find that if the boundary of the facial mesh is good enough (e.g. that of the person shown in FIG. 7D), the PCA algorithm itself can generate a quite good mirror plane, which is very close to the bilateral symmetry plane of the face.

TABLE 1

Mean distance between the original mesh and the mirrored one, before and after the ICP algorithm.

| Mean Dis. (mm) | Person 1 | Person 2 | Person 3 | Person 4 |
| --- | --- | --- | --- | --- |
| Before ICP | 3.088 | 2.329 | 1.162 | 1.162 |
| After ICP | 1.316 | 1.103 | 1.030 | 0.958 |

Symmetry Profile Extraction

After the original facial surface S and the mirrored surface $S_m$ have been registered, the symmetry plane can be fitted easily. Define $$p_c^i = \frac{1}{2}(R_{ICP} \cdot (p_m^i - t_{ICP}) + p^i), \quad i = 1, 2, \ldots, N \quad (7)$$

where $R_{ICP}$ and $t_{ICP}$ are the rotation matrix and the translate vector output by the ICP algorithm respectively. The midpoints $p_c^i$, i=1,2, . . . ,N, are used to fit a least square plane, which is the final symmetry plane, denoted as $PL^S$. The symmetry profile of a face is extracted by intersecting $PL^S$ with the facial surface S. The complexity of this process is $O(\sqrt{N})$.

FIG. 7B shows the final symmetry planes of each of the four facial surfaces of FIG. 7A.

Symmetry Profile Analysis

The symmetry profile extraction takes us much closer to recognizing a face. The symmetry profile passes through the center of the forehead, the ridge of the nose, the philtrum, the mouth and the chin. However, the nose seems to be the most robust geometrical feature on the symmetry profile and even on the entire face. It is least changed under different expressions and contains clearly distinguishable points. We attempted to understand the symmetry profile by only analyzing the curvature of the profile curve. But different individuals show quite different curvature plots of the symmetry profile curves, including the number of inflection points. Some profiles go from the forehead to the chin; the others go from the chin to the forehead. So, the sign of the curvature at specific points, e.g. the nose tip, might be different among symmetry profiles. The point corresponding to the largest curvature might be the nose tip, the upper or lower mouth lip, and the conjunction point between the nose and the philtrum, and so on. Because of this, we use clues from both the facial surface curvature analysis and the symmetry profile curvature analysis.

Mean Curvature Plot of the Facial Surface

We first roughly isolate the nose from its surrounding area by means of facial surface curvature analysis. According to a preferred method, we use the mean curvature plot to isolate the nose. It will be understood to those of skill in the art, however, that other analysis methods can be used to achieve this. Some other examples of such methods include the principle curvature plot, the Gaussian curvature plot and the HK segment method. The experiments show, however, that the mean curvature plot is the most effective method to isolate the nose.

We calculate the mean curvature on the facial mesh S as follows. Taking the centroid of each triangle $\{i,j,k\}$ in S as the origin, we establish a quadratic surface $$Q(u,v) = (u,v,h(u,v)) \quad (8)$$

Where $$h(u,v) = au^2 + buv + cv^2 \quad (9)$$

axis h points to the normal direction of that triangle, u and v are in the triangle plane and orthogonal to each other. By substituting the vertices of $\{i\}, \{j\}, \{k\}$ and their 1-ring neighbor vertices to the quadratic surface $Q(u,v)$, the parameters a, b and c can be determined by least square fitting. The curvature at $Q(0,0)$ is taken as the curvature at the centroid of triangle $\{i,j,k\}$. According to differential geometry, the mean curvature at $Q(0,0)$ is $$H = a + c \quad (10)$$

We classified the curvature values into three scales. Define $$\begin{cases} H_1 = H_{min} + \frac{1}{3}(H_{max} - H_{min}) \\ H_2 = H_{min} + \frac{2}{3}(H_{max} - H_{min}) \end{cases} \quad (11)$$

where $H_{max}$ and $H_{min}$ are the maximum and minimum mean curvature values. To eliminate the effect of noise, the 1% highest and lowest mean curvature values are not taken into account in searching for $H_{max}$ and $H_{min}$.

For triangle $T_i$, a color attribute is attached to it by $$\text{color}(T_i) = \begin{cases} \text{"blue"}, & \text{if } H_i < H_1 \\ \text{"red"}, & \text{if } H_1 \leq H_i \leq H_2 \\ \text{"green"}, & \text{if } H_i > H_2 \end{cases} \quad (12)$$

where $H_i$ is the mean curvature value at the centroid of $T_i$.

Figure 9A:
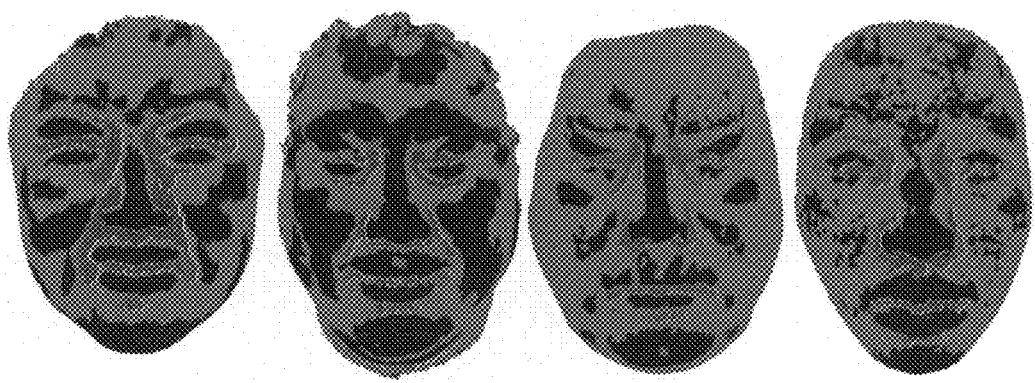
FIG. 9 shows mean curvature plots (FIG. 9A) of the four facial surfaces of FIG. 7 and the corresponding colored symmetry profile (FIG. 9B) of each facial surface.

FIG. 9A shows the mean curvature plots, in terms of the color attribute, of each of the four faces of FIG. 7A. Colored regions which are isolated and smaller than a criterion are automatically merged to their surrounding regions. In FIG. 9A, the mean curvature of the nose of each face is blue. Our experiments show that the nose in the mean curvature plot is almost always blue (except for only one out of the 213 tested facial meshes), despite the large appearance variation among individuals. The mean curvature plot is used, as described below, to extract some essential points on the symmetry profile.

Curvature Analysis of the Symmetry Profile

For analyzing the symmetry profile, we also need to calculate the curvature of the symmetry profile curve. Since the symmetry profile is generated by intersecting the symmetry plane with the facial mesh S, it is represented by a planar polyline. The curvature at each vertex $x_i$ on the polyline is calculated by locally fitting a least square parabola $$q(t) = (t, f(t)) \quad (13)$$

where $$f(t) = a_c t^2 + b_c t + c_c \quad (14)$$

Axis f and t are the binormal and the tangent direction of the symmetry profile curve at $x_i$ respectively. By substituting the local coordinates of vertices $x_j$, $j=i-2, \ldots, i+2$ to the parabola $q(t)$, the parameters $a_c$, $b_c$ and $c_c$ in Eq. (14) can be determined by using the least square fitting. The curvature at $x_j$, i.e. $q(0)$, is $$\kappa = 2a_c/(1+\sqrt{b_c^3}) \quad (15)$$

FIGS. 10 and 11 show curvature plots of the symmetry profiles of the face surfaces of two individuals. FIGS. 10A and 11A show the face surfaces. FIGS. 10B and 11B show the curvature distribution with respect to the arc length for the face surfaces of FIGS. 10A and 11A, respectively. FIGS. 10C and 11C show the curvature distribution along the symmetry profile of the faces of FIGS. 10A and 11A, respectively. Each of these curvature distributions was generated by projecting a line segment along the normal direction at each point of the symmetry profiles of the face surface. The length of the segment is proportional to the signed curvature at that point. From FIGS. 10C and 11C, we can also see that the signs of the curvature at specific points, e.g. at the nose tips, are different in the two examples. This is because one profile is from the forehead to the chin, and the other is from the chin to the forehead.

Essential Points Recognition

Figure 10A:
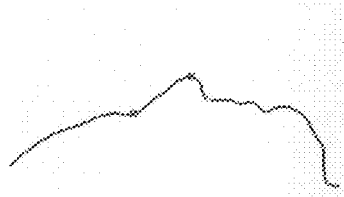
FIG. 10 shows the curvature plots and the three essential points of the symmetry profile of the face surface of FIG. 10A.
FIG. 10B shows the curvature distribution with respect to the arc length.
FIG. 10C is generated by attaching a line segment along the normal direction at each point of the symmetry profiles.
FIG. 10D shows the three essential points $P_{NT}$, $P_{NB}$ and $P_{NL}$ extracted for the face surface.
Figure 10B:
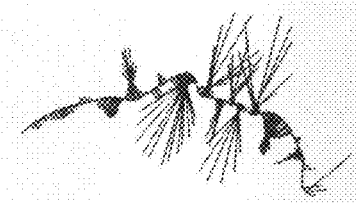
Figure 10C:
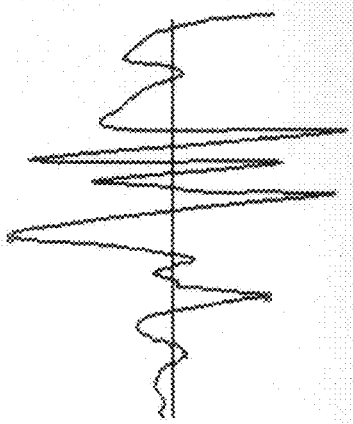
Figure 10D:
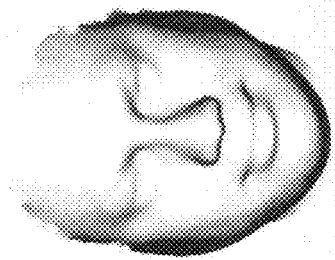
Figure 11A:
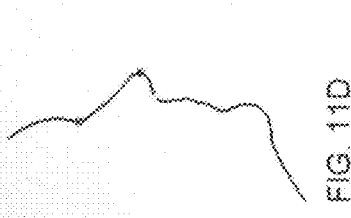
FIG. 11 shows curvature plots and the three essential points of the symmetry profile for another example of a face surface, shown in FIG. 11A.
Figure 11B:
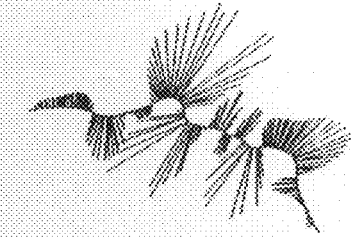
Figure 11C:
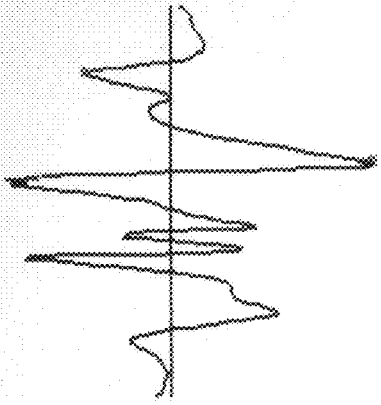
Figure 11D:
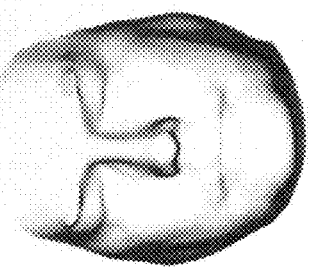

Using the mean curvature of the facial surface and the curvature of the symmetry profile, we can recognize three essential points on the symmetry profile, namely the nose tip (denoted as $P_{NT}$), the nose bridge (denoted as $P_{NB}$), and the lowest point of the nose (denoted as $P_{NL}$). FIGS. 10D and 11D show the three essential points $P_{NT}$, $P_{NB}$ and $P_{NL}$ for each of the face surfaces of FIGS. 10A and 11A, respectively.

Figure 9B:
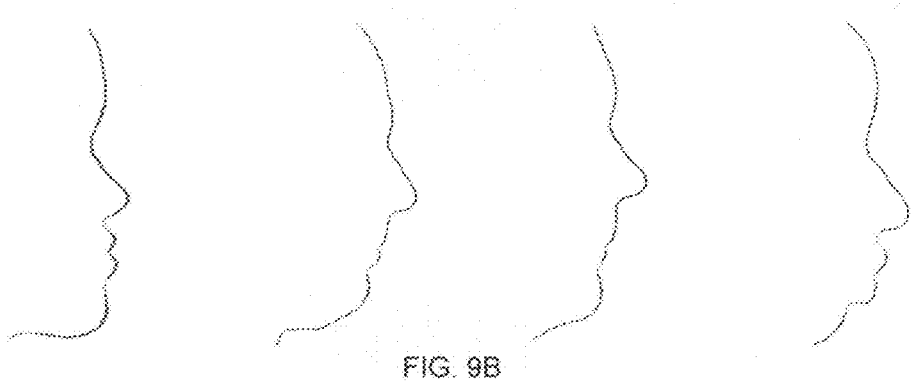

The points $P_{NT}$, $P_{NB}$ and $P_{NL}$ are automatically extracted as follows. First, the color of the facial surface (see FIG. 9A) is inherited by the symmetry profile, i.e., if a line segment in the symmetry profile is the intersection between the symmetry plane and a triangle in the facial mesh S, the color of that line segment is the same as the color of that triangle. In this way, we get a colored symmetry profile, as shown in FIG. 9B. This is exactly the way we use the mean curvature plot. We only make use of the mean curvature information of the facial surface along the symmetry profile.

We then use some prior knowledge to extract the three essential points $P_{NT}$, $P_{NB}$ and $P_{NL}$ on the symmetry profile. Suppose the symmetry profile is represented by a normal arc-length parameterized curve $C(s)$. The first essential point to be extracted is the nose tip $P_{NT}$. In the colored symmetry profile, the nose is a relatively long blue segment. The only other part that might be confused with the nose is the chin, which can also be a relatively long blue segment. However, the nose segment is always located closer to the center point $C(0.5)$ of the symmetry profile than the chin is. That distinguishes the nose segment from the other geometric features in the symmetry profile. Suppose the blue nose segment is denoted as $[s_0'', s_1'']$. We take the point with the largest absolute curvature value $\kappa$ in that segment as the nose tip $P_{NT}$, i.e.

$$s_{NT} = \underset{s \in (s_0'', s_1'')}{\operatorname{argmax}}(|k(s)|) \quad (16)$$

If the curvature value at $P_{NT}$ is negative, the curvature value at each vertex on the profile is multiplied by $-1$.

The symmetry profile can be regarded as two parts separated at $P_{NT}$. The part from $P_{NT}$ to the end of the forehead is called the upper part; the part from $P_{NT}$ to the end of the chin is called the lower part. If $|S_{NT}-S_0''|<|S_{NT}-S_1''|$, the direction from $S_{NT}$ to $S_0''$ is towards the chin, otherwise, the direction from $s_{NT}$ to $s_0''$ is towards the forehead. In this way, we distinguish the upper part and the lower part. Taking $P_{NT}$ as the starting point, we search in the lower part for the first point with local minimal curvature value $\kappa$. That point is taken as $P_{NL}$. We then search in the entire upper part for the point with the smallest curvature value $\kappa$. That point is taken to be $P_{NB}$. It should be noticed that, taking $P_{NT}$ as the starting point, $P_{NB}$ is not necessarily the first point with local minimal curvature in the upper part, because some people have extra local minimal curvature values on their noses, as shown in FIGS. 10 and 11.

From the above description we can see that the requirement for coloring the facial mesh and the symmetry profile is very loose. Differently from the other face segmentation methods based on curvature analysis, the mean curvature plot in our approach is only used to roughly estimate a segment on the symmetry profile within which the nose tip is located. The mean curvature plot of the facial surface is robust enough for this loose requirement. On the other hand, the colored symmetry profile does provide a basic and important clue for locating the nose tip and determining the up/down direction of the profile.

Similarity Comparison

Figure 12:
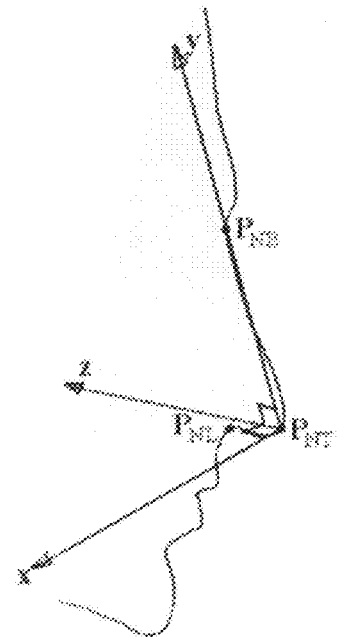
FIG. 12 illustrates the Face Intrinsic Coordinate System (FICS), in which the y-axis and z-axis lie in the symmetry plane, and the x-axis perpendicular to the symmetry plane.
Figure 16A:
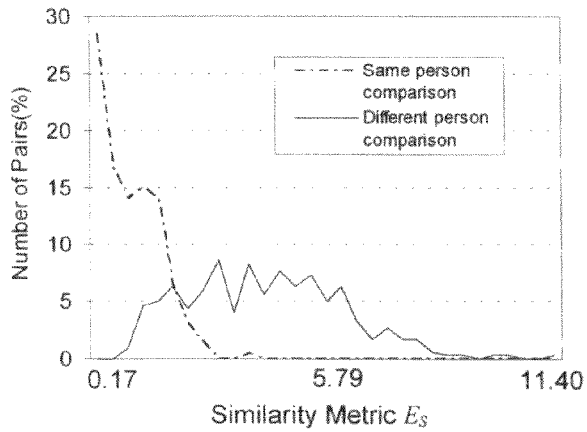
FIG. 16 shows similarity metric distribution in authentication tests conducted according to our invention.
Figure 16B:
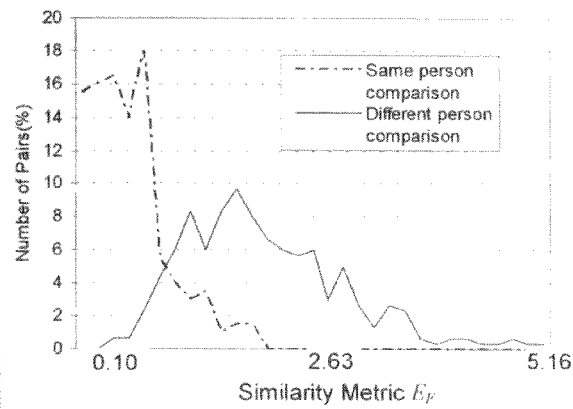
Figure 16C:
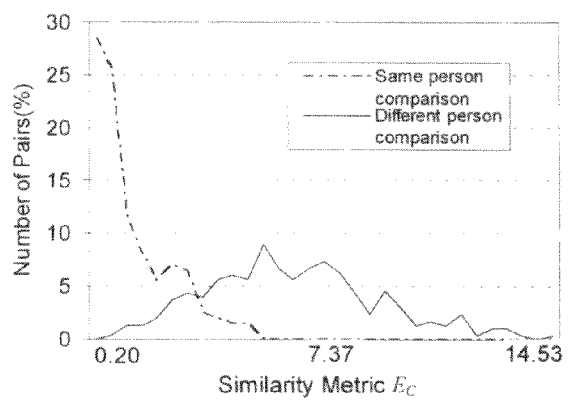
Figure 16D:
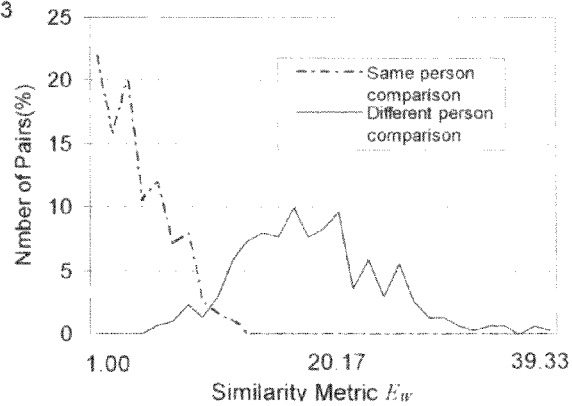

As shown in FIG. 12, the three essential points $P_{NT}$, $P_{NB}$, $P_{NL}$ uniquely determine a coordinate system. With $P_{NT}$ is the origin, vector $V_{TB}$ represents the direction of the y-axis, where $V_{TB}=(P_{NT}-P_{NB})/\|P_{NT}-P_{NB}\|$. The cross product of $V_{TB}$ and $V_{TL}$ coincide with the direction of the x-axis, where $V_{TL}=(P_{NT}-P_{NL})/\|P_{NT}-P_{NL}\|$. The z-axis is determined by the right-hand rule. This coordinate system we call the Face Intrinsic Coordinate System (FICS).

There are multiple choices for computing the similarity between faces. A good choice should satisfy the following criteria:

It should be discriminative enough.

It should be computationally efficient.

It should lead to a concise representation of the face so as to reduce the space size of the face database.

According to a preferred method, we use the mean distance between the aligned representations of the faces that we define as the SFC face representations. The SFC representation includes three profiles on the facial surface, namely the symmetry profile, the forehead profile and the cheek profile.

Figure 13A:
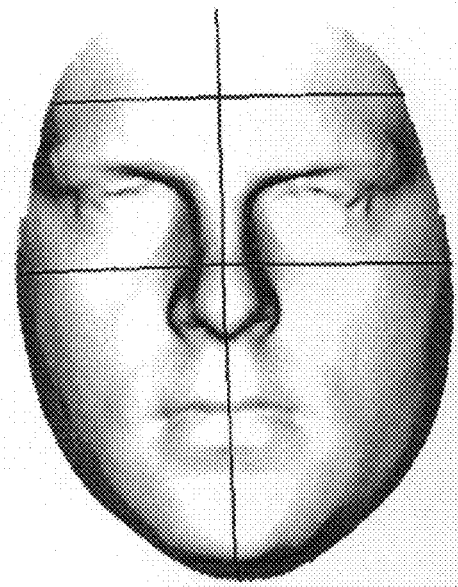
FIG. 13A shows the front view of the facial surface with the profiles.
Figure 13B:
FIG. 13B shows the isometric view of the profiles and FIG. 13C shows the isometric view of the SFC representation registered with a second SFC representation.

FIG. 13 shows the SFC representation of an example facial surface, with FIG. 13A showing the front view of the facial surface with the profiles and FIG. 13B showing the isometric view of the profiles. The transversal forehead profile is the intersection between the facial surface and the plane $PL(P_f, n)$, where $P_f$ is the point on the symmetry profile and 3 cm away from the nose bridge point $P_{NB}$ in terms of the arc length, and $n=P_{NT}-P_{NB}$ is the normal vector of the plane. The transversal cheek profile is the intersection between the facial surface and the plane $PL(P_c, n)$, where $P_c$ is the point on the symmetry profile and 2 cm away from the nose tip point $P_{NT}$ in terms of the arc length. The reason for selecting the 3 cm/2 cm points is to avoid the eye regions which are not rigid enough. After the SFC representation is obtained, it is transformed to the FICS. Finally the SFC representation, rather than the space-consuming facial mesh, is stored in the database.

Figure 13C:
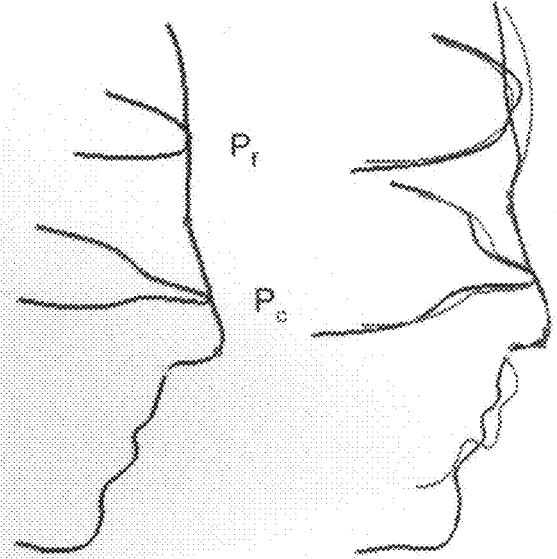

Since the SFC representations are under their FICSs, they are roughly aligned. To compute the similarity between two faces, we further optimize the symmetry profile alignment by using the ICP algorithm again. Only the points between $P_{NL}$ and $P_{NB}$ on the two symmetry profiles respectively are used to optimize the alignment. The rotation and translation transforms that are output by the ICP algorithm are applied to the second symmetry profile. The computation expense in this procedure is almost negligible, for the number of points between $P_{NL}$ and $P_{NB}$ on the symmetry profile is typically less than 100, and their initial relative locations are very close. For the two transversal forehead profiles, we apply a translation to make $P_{f1}$ and $P_{f2}$ as well as $P_{c1}$ and $P_{c2}$ coincide respectively. FIG. 13C shows an isometric view of two registered SFC representations.

After the SFC representations of two faces are finally registered, the similarity metric between them can be calculated. Let L1 and L2 be two profiles. Because the distance between two polylines is directional, i.e. the mean distance from L1 to L2 and that from L2 to L1 might be different, we define $$E_1 = \frac{1}{N_{L1}} \sum_{p_1 \in L1} \text{Min}_{p_2 \in L2} d(p_1, p_2) \tag{17}$$

$$E_2 = \frac{1}{N_{L2}} \sum_{p_2 \in L2} \text{Min}_{p_1 \in L1} d(p_2, p_1) \tag{18}$$

where N denotes the number of sampled points on the profile, d is the Euclidean distance. The similarity (accurately dissimilarity) metric between the two profiles L1 and L2 is defined as:

$$E = \frac{1}{2}(E_1 + E_2) \tag{19}$$

Figure 14:
FIG. 14 illustrates distance measurements between profiles of two faces that are registered for comparison according to the present invention, wherein the two profiles differ in length.

FIG. 14 illustrates distance measurements between profiles of two faces that are registered for comparison according to the present invention. It should be noted that the corresponding profiles of two compared faces may be different in length, as shown in FIG. 14. In such a case, the longer parts of the profiles (see the gray segment in FIG. 14) are automatically truncated for similarity computation.

According to Eq. (17)~Eq. (19), we compute three similarity metrics $E_S$, $E_F$ and $E_C$, where $E_S$ is the mean distances between the symmetry profiles, $E_F$ is the mean distance between the forehead profiles and the $E_C$ is the mean distance between the cheek profiles. Below we discuss experimental results on face authentication using the three metrics and their weighted combination defined as:

$$E_W = w_S E_S + w_F E_F + w_C E_c \tag{20}$$

where w represents the weight of a metric.

It is straightforward to offset the profile planes to get more vertical and/or transversal profiles. Our experiments showed, however, that recognition accuracy would decrease instead of increase when too many profiles were used, especially in case of extreme expressions.

EXPERIMENTAL RESULTS

The following test examples and results help to further explain the invention. It will be understood, however, that the examples are illustrative of the invention and that the invention is not limited only to these examples.

Our method was tested on 213 face surfaces, which came from 164 individuals and covered a wide ethnic variety and different expressions. The Equal Error Rate (EER) of face authentication on the tested faces was 3.8% and the rank one recognition rate was 90%.

Data Acquisition

We conducted experiments with the system and method of our invention using a 2-pod Qlonerator scanning system from 3Q Technologies, Ltd. Of Atlanta, Ga. (http://www.3q.com/) to scan faces. The Qlonerator system outputs textured 3D triangular mesh surfaces in natural light environment. We discarded the texture information and kept the triangular mesh in our algorithm. This is partly because the texture information is not reliable in some cases. Another consideration is that using only the triangular mesh makes the algorithm suitable for dealing with datasets obtained by other types of scanner.

We scanned 164 individuals in our experiments. Twenty individuals had more than two scans. One of them had 20 scans with different expressions. FIG. 15 shows scans of multiple expressions for the same person for an individual. We investigated 213 total facial meshes, which covered a wide ethnic and age variety, different facial hair conditions and various expressions. No one in our experiments wore glasses.

Preprocessing of original scans involved: (1) semiautomatic trimming of the original mesh to remove the extraneous regions, leaving only the face; (2) automatically relaxing the triangular mesh to make it manifold and smoother; and (3) automatically filling holes and removing spikes in the surface. After preprocessing, we obtained clean facial meshes.

FIG. 15A shows examples of textured 3D meshes directly output by the scanner, and FIG. 3B shows the corresponding clean faces without texture.

Authentication

Face authentication involves performing verification based on a one-to-one search to validate the identity claim of the individual (i.e., access control for a building, room, or for making a transaction at an ATM terminal). In the applications of face authentication, a dissimilarity threshold should be determined for accepting or rejecting a claim.

In our facial authentication experiments, we compared 300 pairs of faces from different persons, and 200 pairs of faces from the same persons. To obtain the different person comparisons, three faces were randomly selected from the 164 scans in the database, and each was compared with all the other scans. 300 out of the 489 (3×163) different person comparisons were randomly chosen to conduct the statistical analysis. To obtain the same person comparisons, each pair of the 20 scans of a person were compared, which generates 190 comparisons. FIG. 8 illustrates some of the expressions and postures of the 20 scans. Ten more same person comparisons were performed on ten different individuals who had two scans.

Here we provide some statistical terminologies for face authentication. Given pairs of facial meshes of the same person, Error Rejection Rate (ERR) is the percentage that is falsely rejected as different persons. Given pairs of facial meshes of different persons, Error Acceptance Rate (EAR) is the percentage that is falsely accepted as the same person. If ERR=EAR under a threshold of a specific metric, then that percentage is called Equal Error Rate, which can be used to evaluate the performance of the comparison algorithm. C. Beumier, M. Acheroy. Automatic 3D face authentication. Image and Vision Computing, 18:315-321 (2000).

Figure 17:
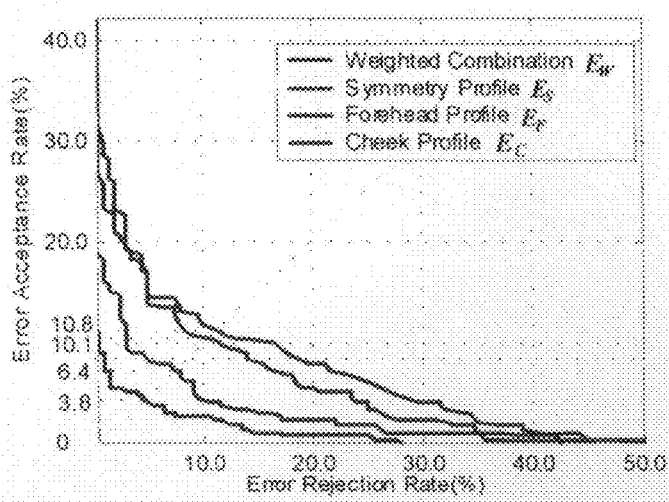
FIG. 17 shows ROC curves of different metrics in authentication tests conducting according to our invention.

We first investigated the discriminating power of each metric $E_S$, $E_F$ and $E_C$. Our experiments show that $E_F$, i.e. the metric of mean distance between forehead profiles, has the smallest average value and outperforms $E_S$ and $E_C$ (see FIG. 16 and FIG. 17). This suggests that the weight $w_F$ in Eq. (20) should be larger than $w_S$ and $w_C$. It is possible to optimize the three weights in view of statistical analysis. But in all our experiments so far, we set $w_S=w_C=1.0$, $w_F=4.0$ for the weighted combination metric $E_w$. FIG. 16 illustrates the histogram of number of pairs with respect to the metrics. FIG. 17 shows the face authentication ROC curves of different metrics. The EER of the weighted combination metric $E_W$ is 3.8%.

Recognition

While the focus of the present method of our invention is face authentication, the method can be used in face recognition tasks as well. In face recognition applications, one-to-many searches are performed to identify an unknown individual based on comparison to a database of known individuals (e.g., law enforcement and surveillance). Unlike the authentication scenario, face recognition does not need a criterion to determine if two scans represent the same person. Instead face recognition needs to find the "best match" in terms of some similarity metric of a given scanned data from the database.

Figure 18A:
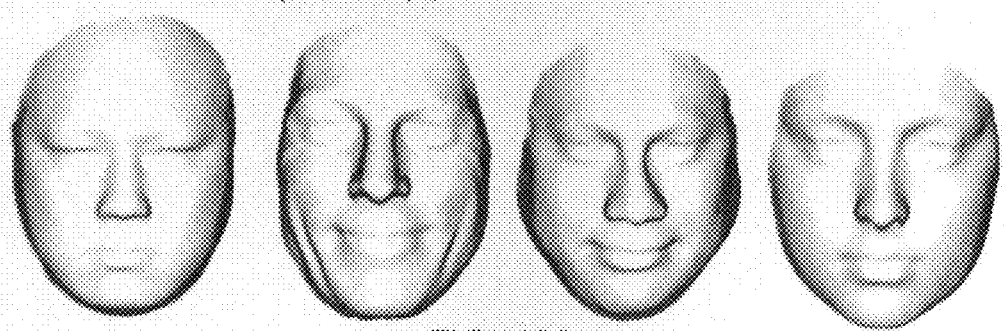
FIG. 18A shows the scans in the database.
Figure 18B:
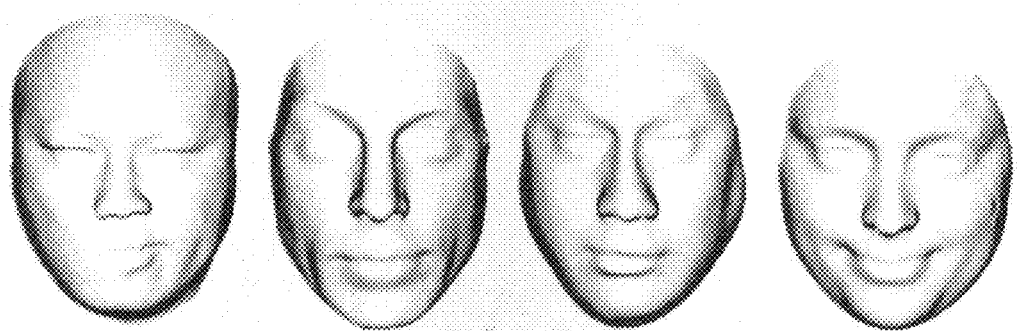
FIG. 18B shows the corresponding scans to be recognized.
Figure 19:
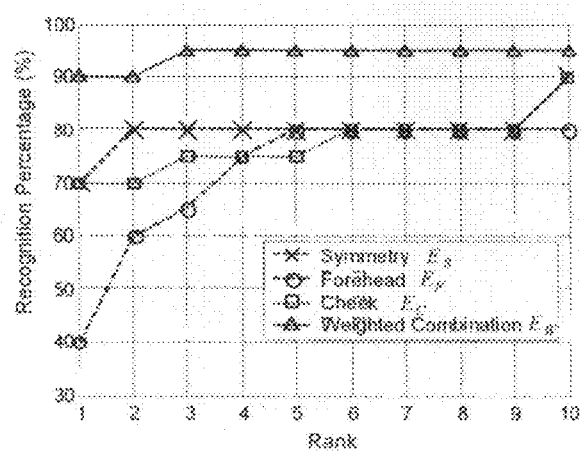
FIG. 19 shows performance results in the face recognition tests.

We performed face recognition experiments on 20 individuals. The database contained the facial meshes of 164 individuals, which include the 20 tested persons. One different scan of each tested person was compared to all the 164 scans in the database. FIG. 18 shows the two scans of part of the tested individuals in the face recognition experiment. The first row is the scans in the database. The second row is the corresponding scans to be recognized. In this experiment, some tested persons also had different expressions or appearances in their two scans, as shown in FIG. 18. The performance of the similarity metrics $E_S$, $E_F$, $E_C$ and $E_W$ in face recognition experiment is illustrated in FIG. 19. Just as in the authentication experiments, the weighted combination ($E_W$) is still the best metric in face recognition. But in the recognition experiments, the performance of the forehead profile metric $E_F$ was worse than the other two profile metrics $E_S$ and $E_C$.

Computation Analysis

The average number of triangles contained in one facial mesh in our experiments was about 13,000. It took an average time of 3.8 seconds to obtain the SFC representation from a clean facial mesh. The most time-consuming stage was the ICP algorithm for aligning the original and the mirrored mesh, which took an average time of 1.6 seconds. The second time-consuming procedure was the mean curvature computation of the facial mesh, which took 1.4 seconds. After the face database of SFC representations was established, comparison between two faces took an average time of 0.7 second. The times reported in this paper are all the experimental results on a 1 GHz Pentium IV PC with 512M RAM.

The average size of the SFC representation is about 30 KB, which is about 30 times smaller than the size of the triangular mesh representation.

CONCLUSION

The above-described invention possesses numerous advantages as described herein. We have demonstrated an approach for human face authentication and recognition from 3D facial meshes. The method is based on the extraction of the bilateral symmetry plane and the recognition of three essential points of the face geometry, which prove to be robust to asymmetry boundaries and appearances of the scans. We also have provided a compact representation of the 3D face geometry, namely the SFC representation. Face authentication and face recognition are studied by comparing the mean distance between SFC representations. The weighted combination $E_W$ of the similarity metrics of the symmetry profile, the forehead profile and the cheek profile generates promising authentication and recognition rates under various expressions. Authentication and recognition experiments also show that the false results are mainly caused by extreme expressions. The time and space consumption in the proposed method is acceptable in classic face comparison scenarios.

The invention in its broader aspects is not limited to the specific details, representative devices, and illustrative examples shown and described. Those skilled in the art will appreciate that numerous changes and modifications may be made to the preferred embodiments of the invention and that such changes and modifications may be made without departing from the spirit of the invention. For example, if the similarity metric $E_W$ between two scans falls into an interval that cannot be determined for sure (The interval between the zero EAR and zero ERR. See the similarity metric distribution in FIG. 16), additional comparison, e.g. between the nose surfaces, might be performed to improve the authentication and recognition effects. As another example, although we have obtained promising results using only the 3D geometry information, the scan texture information may be used as an additional clue in face comparison tasks.

Therefore, the invention in its broader aspects is not limited to the specific details, representative devices, and illustrative examples shown and described. Accordingly, departures may be made from such details without departing from the spirit or scope of the general inventive concept.

What is claimed is:

1. A method for automatic authentication and recognition of a human face, the method comprising:

generating a three-dimensional facial mesh representing the surface of a human face to be authenticated;

extracting from the facial mesh a bilateral symmetry plane;

computing a symmetry profile representing the intersection between the symmetry plane and the facial mesh;

computing a transversal forehead profile for the facial mesh;

computing a transversal cheek profile for the facial mesh;

storing the symmetry profile, the forehead profile and the cheek profile as a compact representation of the surface of the face to be authenticated;

extracting three points on a portion of the symmetry profile representing the nose automatically using both mean curvature plot of the facial mesh and curvature plot of a curve representing the symmetry profile, the three points uniquely determining a face intrinsic coordinate system;

using the face intrinsic coordinate system to align the compact representation of the surface of the face to be authenticated with one or more stored compact representations of human faces; and comparing the compact representation of the surface of the face to be authenticated with the one or more stored compact representations of human faces.

* * * * *